Feb. 17, 1942.　　A. M. STONER　　2,273,293
SELF-TIGHTENING CHUCK
Filed June 14, 1940
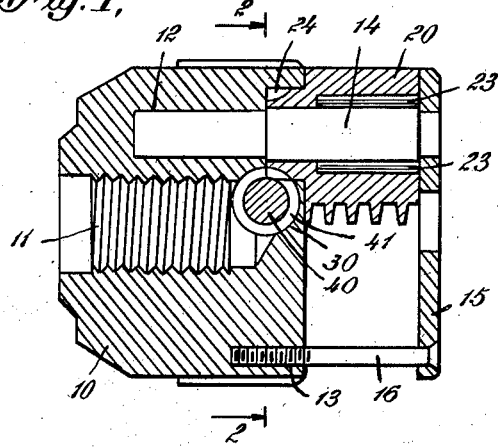
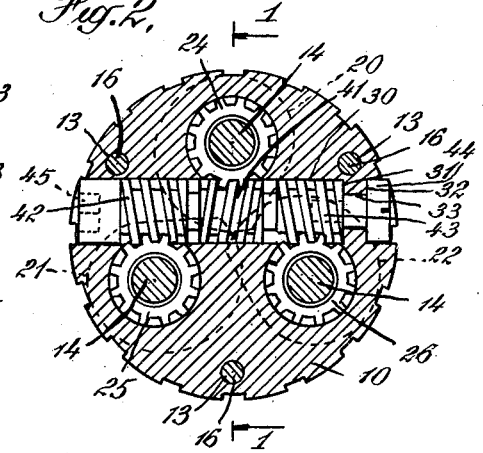
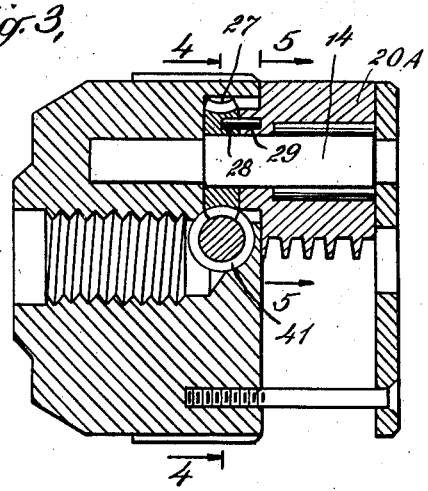
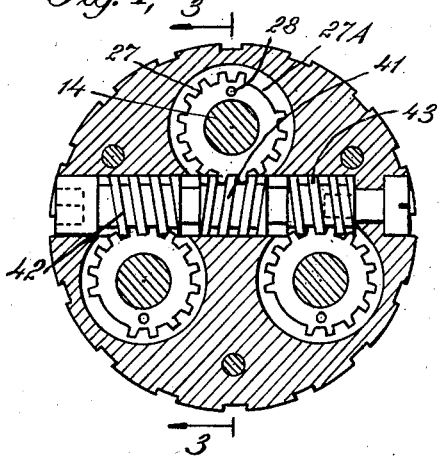
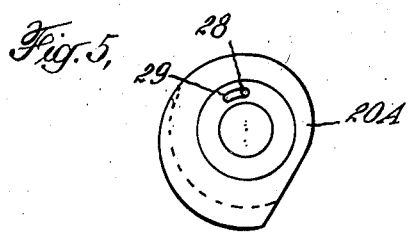
INVENTOR
Arthur Merrick Stoner
BY
Marshall & Hawley
ATTORNEYS Patented Feb. 17, 1942

2,273,293

UNITED STATES PATENT OFFICE 2,273,293

SELF-TIGHTENING CHUCK

Arthur Merrick Stoner, West Hartford, Conn., assignor to The Jacob Manufacturing Company, Hartford, Conn., a corporation of Connecticut Application June 14, 1940, Serial No. 340,518

4 Claims. (Cl. 279—34)

This invention relates to improvements in self-tightening chucks of the type shown in Patent No. 2,207,230, issued to me July 9, 1940, and its object is to improve the initial tool engaging mechanism of chucks of this type.

Another object is to provide a simple, inexpensive and compact chuck actuating mechanism, one advantage of which is that chucks which embody this invention can be made in small sizes without the sacrifice of strength.

Referring to the drawing,

Fig. 1 is a sectional side elevation of a chuck which is made according to and embodies this invention, the section being taken on the line 1—1 of Fig. 2;

Fig. 2 is a sectional end view of the chuck shown in Fig. 1. The section in this figure is taken on the line 2—2 of Fig. 1;

Figs. 3 and 4 are similar views of a modified form of construction which also embodies this invention, Fig. 3 being a sectional side elevation taken on the line 3—3 of Fig. 4, and Fig. 4 a sectional end view taken on the line 4—4 of Fig. 3; and Fig. 5 is a sectional rear view of one of the clamping jaws shown in Figs. 3 and 4, the section being taken on the line 5—5 of Fig. 3.

10 designates a substantially cylindrical body on which the other parts of the chuck are mounted. 11 is an internally threaded axial bore extending into the body from the rear end thereof adapted to fit the driven spindle of a machine tool, such as a power drill. In the front end of the body are three post holes 12 equally distant from the axis of the body and equally spaced angularly from each other. Between them are tapped holes 13. Posts 14 are supported in the holes 12 on which are rotatively supported clamping jaws 20, 21 and 22. The ends of these posts are of smaller diameter than the intermediate portions and the latter portions are preferably eccentric to the ends which are in the holes 12 to provide for a radial adjustment of the clamping jaws.

Each of the clamping jaws has a cylindrical bore which fits the intermediate portions of one of the posts 14 with interposed rollers 23. Each jaw has an eccentric body and spaced eccentric ribs which overlap in certain positions of the jaws. Worm gear teeth 24, 25 and 26 are cut in the rear ends of the clamping jaws 20, 21, 22 respectively.

The jaws are held in place by a clamping plate 15 through which the ends of the posts 12 extend. The cover plate is secured to the body 10 by screws 16 which engage the threaded holes 13 in the body.

Midway between the axis of the post hole 12 which supports the post on which the jaw 20 is mounted and a line through the axes of the other two post holes 12 is a cylindrical transverse bore 30 parallel with the line through the axes of said other two post holes. This transverse bore terminates in a shoulder 31. A shallow bore of similar diameter in the opposite side of the body forms another shoulder 32. Through the center of the part of the body left between these two bores is a smaller bore 33.

40 is a cylindrical member fitted into the bore 30 having a worm screw 41 cut in an intermediate portion which meshes with the worm gear 24 on the rear end of the clamping jaws. At each side of the worm screw 41 are other worm screws 42, 43 of opposite pitch from that of the worm screw 41. These mesh with the clamping jaw worm gears 25 and 26 respectively. The inner end of the member 40 is seated on the shoulder 31 and is held thereon by a screw 44, which passes through the bore 33 into the member 40. The head of this screw is seated on the shoulder 32. A flat sided pocket 45 is formed in the other end of member 40 for the reception of a wrench.

An important feature of this invention resides in the fact that the worms 41, 42, 43 and worm gears 24, 25, 26 are constructed with an appreciable amount of back-lash which is necessary for the operation of the device which will now be described.

With the clamping jaws positioned to receive a tool, the tool is inserted between them. The member 40 is rotated and through the worm screws and gears described, the clamping jaws are rotated simultaneously into an initial contact with the tool. Now when the chuck is rotated the tool will rotate with it, but when the tool is applied to work its rotation will be opposed and this will cause a relative rotative movement between the tool and the chuck. The frictional engagement between the tool and the clamping jaws is greater than that between the clamping jaws and their supporting posts between which are the anti-friction rollers 23, consequently this relative movement will be imparted to the jaws to provide the required gripping effect. This loosens the clamping jaw worm gears from their respective worms so that the latter perform no part in the final gripping of the tool. The worms may, therefore, be of sufficiently high pitch as to have no self-holding effect.

In the modification shown in Figs. 3, 4 and 5, the clamping jaws have no worm gears. A worm gear 27 which is in mesh with the worm screw 41 is rotatively mounted on the post 14 which supports the clamping jaw 20A, a pin 28 projects from this worm gear into a slot 29 in the rear end of the clamping jaw 20A to provide a lost motion driving engagement. The worm gear 27 is mutilated, as at 27A, to facilitate assembly of the parts.

It is to be understood that the other clamping jaws are similarly connected with the member 40 and it is obvious that the operation of this arrangement is similar to that already described.

Other modifications may be made within the spirit and scope of this invention and I intend no limitations other than those imposed by the appended claims.

What I claim is:

1. A self-tightening chuck of the type which comprises a plurality of eccentric clamping jaws pivotally supported on angularly spaced posts, actuating mechanism comprising worm gears operatively connected with the clamping jaws, and worm screws in mesh with said worm gears whereby the clamping jaws may be moved simultaneously by the rotation of the worm screws into contact with a tool, in which mechanism means for providing a clearance is incorporated whereby, after said actuating mechanism has been brought to rest a rotation may be imparted to the clamping jaws by the tool engaged by the jaws, beyond and independent of the rotation initially imparted to the jaws by the rotation of the worm screws.

2. A self-tightening chuck of the type which comprises a plurality of eccentric clamping jaws pivotally supported on angularly spaced posts, actuating mechanism comprising worm gears operatively connected with the clamping jaws, and worm screws in mesh with said worm gears whereby the clamping jaws may be moved simultaneously by the rotation of the worm screws into contact with a tool, in which mechanism means for providing a clearance is incorporated whereby, after said actuating mechanism has been brought to rest a rotation may be imparted to the clamping jaws by the tool engaged by the jaws, beyond and independent of the rotation initially imparted to the jaws by the rotation of the worm screws and in which chuck anti-friction means are interposed between the jaws and their supporting posts.

3. A self-tightening chuck of the type which comprises a plurality of eccentric clamping jaws rotatively supported on angularly spaced posts and means for simultaneously rotating the jaws into contact with a tool, in which the rotating means is gearing which comprises a member having spaced worm screws and an intermediate worm screw of opposite pitch, worm gears on the supporting posts in mesh with said worm screws and a lost motion connection between each of said gears and one of the clamping jaws.

4. A self-tightening chuck of the type which comprises a plurality of eccentric clamping jaws rotatively supported on angularly spaced posts and means for simultaneously rotating the jaws into contact with a tool, in which the rotating means is gearing which comprises a member having spaced worm screws and an intermediate worm screw of opposite pitch, worm gears on the supporting posts in mesh with said worm screws and a lost motion connection between each of said gears and one of the clamping jaws and in which chuck anti-friction means are interposed between the jaws and their supporting posts.

ARTHUR MERRICK STONER